United States Patent
Noujima et al.

(10) Patent No.: US 8,307,863 B2
(45) Date of Patent: Nov. 13, 2012

(54) FUEL FILLING AND WASTE SOLUTION RECOVERY APPARATUS AND FUEL VESSEL

(75) Inventors: Masafumi Noujima, Tokai (JP); Takeyuki Itabashi, Hitachi (JP); Takao Ishikawa, Hitachi (JP); Hiroshi Kanemoto, Hitachinaka (JP); Shinji Yamada, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 839 days.

(21) Appl. No.: 12/194,770

(22) Filed: Aug. 20, 2008

(65) Prior Publication Data

US 2009/0025824 A1 Jan. 29, 2009

Related U.S. Application Data

(63) Continuation-in-part of application No. PCT/JP2007/051078, filed on Jan. 24, 2007.

(30) Foreign Application Priority Data

Feb. 23, 2006 (JP) ................................ 2006-046098

(51) Int. Cl.
*B65B 1/04* (2006.01)

(52) U.S. Cl. .......... 141/285; 141/18; 141/100; 73/19.01
(58) Field of Classification Search .............. 141/2, 4–7, 141/18, 94, 100, 231, 232, 285, 301, 302; 73/19.01
See application file for complete search history.

(56) References Cited

U.S. PATENT DOCUMENTS

| 4,293,399 | A  | * | 10/1981 | Belanger et al. | 204/424 |
| 6,571,151 | B1 | * | 5/2003  | Leatherman | 700/282 |
| 7,169,489 | B2 | * | 1/2007  | Redmond | 429/515 |
| 7,784,501 | B2 | * | 8/2010  | Gershtein et al. | 141/100 |
| 7,784,502 | B2 | * | 8/2010  | Gershtein et al. | 141/100 |
| 2004/0067394 | A1 | | 4/2004 | Sadamoto et al. | |
| 2004/0223907 | A1 | * | 11/2004 | Pez et al. | 423/648.1 |
| 2005/0238553 | A1 | * | 10/2005 | Kuroda | 422/187 |
| 2005/0268986 | A1 | | 12/2005 | Odebrecht et al. | |
| 2006/0259319 | A1 | * | 11/2006 | Mattiola et al. | 705/1 |

FOREIGN PATENT DOCUMENTS

| JP | 2002-020101 | 1/2002 |
| JP | 2002-161997 | 6/2002 |

(Continued)

OTHER PUBLICATIONS

Notification of Transmittal of Translation of the International Preliminary Report; International Application No. PCT/JP2007/051078; International Filing Date: Jan. 24, 2007.

(Continued)

*Primary Examiner* — Gregory Huson
*Assistant Examiner* — Jason K Niesz
(74) *Attorney, Agent, or Firm* — Antonelli, Terry, Stout & Kraus, LLP.

(57) ABSTRACT

Recovery of dehydrogenation product must be done separately from supply of hydrogen fuel. However, there is a problem that it takes much time when dehydrogenation product recovery and fuel filling are done separately. A fuel filling/waste solution recovery apparatus includes measuring means to measure a volume of supplied fuel and a volume of recovered waste solution by measuring flow rates of solutions passing through a fuel filling nozzle and a recovery nozzle or piping, and a display which shows the volume of supplied fuel and the volume of recovered waste solution which are measured by the measuring means.

19 Claims, 16 Drawing Sheets

FOREIGN PATENT DOCUMENTS

| | | |
|---|---|---|
| JP | 2004-131306 | 4/2004 |
| JP | 2004-142831 | 5/2004 |
| JP | 2004-250059 | 9/2004 |
| JP | 2005-315274 | 11/2005 |
| JP | 2005-343453 | 12/2005 |

OTHER PUBLICATIONS

Office Action in Japanese Patent Appln. JP2006-046098, mailed Jan. 18, 2011 (in Japanese, 2 pgs.), partial English language translation (3 pgs.).

* cited by examiner

FIG. 5

| ID | DATE OF DATA UPDATING | FUEL UNIT PRICE | UNIT PRICE | SUPPLIER | WASTE SOLUTION UNIT PRICE | UNIT PRICE | WASTE SOLUTION TREATMENT UNIT PRICE | UNIT PRICE | CARBON TAX | UNIT PRICE | HYDROGEN CONTENT | UNIT PRICE |
|---|---|---|---|---|---|---|---|---|---|---|---|---|
| 1 | 2005/8/10 | 59 | YEN/L | COMPANY A | 19 | YEN/L | 2 | YEN/L | 20 | YEN/L | 0.12 | m³/L |
| 2 | 2005/8/11 | 59 | YEN/L | COMPANY A | 19 | YEN/L | 2 | YEN/L | 20 | YEN/L | 0.12 | m³/L |
| 3 | 2005/8/12 | 59 | YEN/L | COMPANY A | 19 | YEN/L | 2 | YEN/L | 20 | YEN/L | 0.12 | m³/L |
| 4 | 2005/8/13 | 59 | YEN/L | COMPANY A | 19 | YEN/L | 2 | YEN/L | 20 | YEN/L | 0.12 | m³/L |
| 5 | 2005/8/14 | 59 | YEN/L | COMPANY B | 19 | YEN/L | 2 | YEN/L | 20 | YEN/L | 0.12 | m³/L |
| 6 | 2005/8/15 | 58 | YEN/L | COMPANY B | 19 | YEN/L | 2 | YEN/L | 20 | YEN/L | | |
| | | | | | | | | | | | | |
| 1010 | 2010/12/14 | 65 | YEN/L | COMPANY A | 20 | YEN/L | 2 | YEN/L | 40 | YEN/L | 0.12 | m³/L |
| 1011 | 2010/12/15 | 64 | YEN/L | COMPANY A | 20 | YEN/L | 2 | YEN/L | 40 | YEN/L | 0.12 | m³/L |

|   | DATE | TIME | REMARKS | HYDRIDE | DEHYDROGENATION PRODUCT |
|---|------|------|---------|---------|------------------------|
| 1 | 05/06/07 | 17:30 |  | 0.33 | 0.66 |
|   |  |  |  |  |  |

FIG. 16

| MACHINE ID | DATE OF FUEL FILLING | TIME OF FUEL FILLING | VOLUME SUPPLIED | FUEL LOSS | CARBON TAX RATE | CARBON TAX | ... |
|---|---|---|---|---|---|---|---|
| T-1001 | 2005/10/20 | 10:50 | 30 | 1 | 5 | 5 | |
| N-985 | 2005/10/21 | 11:50 | 40 | 5 | 5 | 25 | |
| | | | | | | | |
| | | | | | | | |
| | | | | | | | |

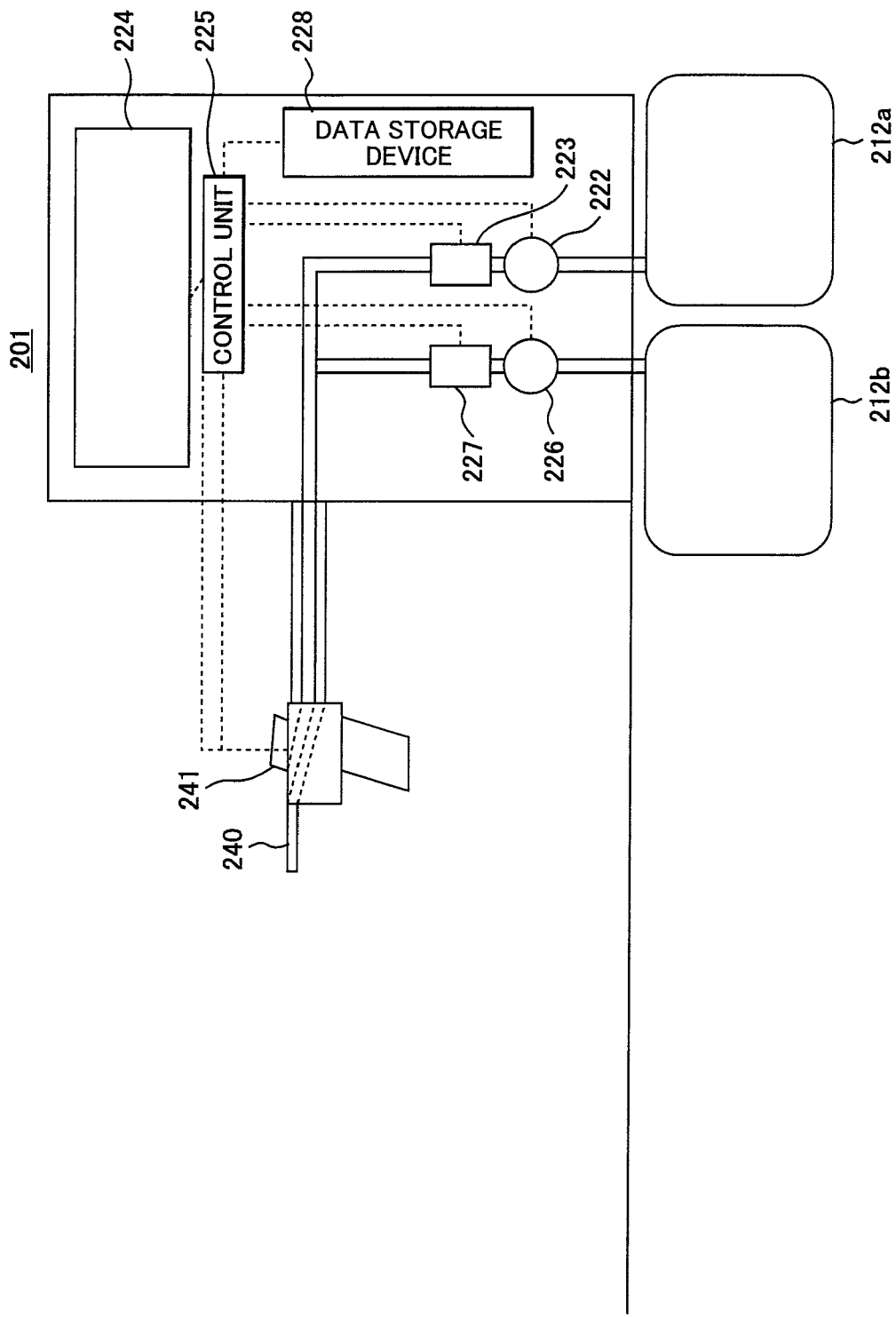

FUEL FILLING AND WASTE SOLUTION RECOVERY APPARATUS AND FUEL VESSEL

CROSS REFERENCE TO RELATED APPLICATION

This application is a Continuation-in-Part of International Patent Application PCT/JP2007/051078 filed on Jan. 24, 2007, the entire contents of which are incorporated herein by reference.

CLAIM OF PRIORITY

The present application claims priority from Japanese Patent Application No. 2006-046098 filed on Feb. 23, 2006, and International Patent Application PCT/JP2007/051078 filed on Jan. 24, 2007, the contents of which are hereby incorporated by reference into this application.

TECHNICAL FIELD

The present invention relates to a fuel filling/waste solution recovery apparatus and a fuel vessel.

BACKGROUND ART

Since hydrogen storage materials have properties similar to those of gasoline, some of the existing infrastructures for petroleum fuels can be used for them and also since their explodability is lower than other hydrogen fuels, they are hydrogen fuels which can be supplied at low cost with safety. However, one feature of hydrogen storage materials is that they generate not only hydrogen but also dehydrogenation product by dehydrogenation. The dehydrogenation product can be reused by repeating hydrogenation and dehydrogenation and it is expected that the cost of hydrogen storage material supply is reduced by taking advantage of this. Therefore, the user of a hydrogen storage material must recover the dehydrogenation product derived from hydrogen generation. One recovery method is that a partition is provided in the fuel tank as disclosed in JP-A No. 2004-250059 (hereinafter referred to as Patent Document 1)
Patent Document 1: JP-A No. 2004-250059

DISCLOSURE OF THE INVENTION

Problem to be Solved by the Invention

According to the method described in Patent Document 1, recovery of dehydrogenation product must be done separately from supply of hydrogen fuel. However, there is a problem that it takes much time when dehydrogenation product recovery and fuel filling are done separately. An object of the present invention is to provide a fuel filling/waste solution recovery apparatus which efficiently recovers the dehydrogenation product derived from the use of a hydrogen storage material fuel.

Means to Solve the Problem

One feature of the present invention is that a fuel filling/waste solution recovery apparatus is a fuel filling/waste solution recovery apparatus which supplies a hydrogen storage material to a fuel vessel of a machine fueled by hydrogen generated by dehydrogenation of a fuel hydrogen storage material and recovers the waste solution derived from dehydrogenation from the waste solution vessel and includes a fuel filling nozzle and a recovery nozzle.

Another feature of the present invention is that a fuel filling/waste solution recovery apparatus includes means to supply a hydrogen storage material to a fuel vessel of a machine fueled by hydrogen generated by dehydrogenation of a hydrogen storage material through a fuel filling nozzle and means to recover the waste solution derived from dehydrogenation from a waste solution vessel through a recovery nozzle, and waste solution is sucked using negative pressure generated by compression and pumping of a fuel fluid during fuel filling. Here, when sucking waste solution, it is preferable in terms of utilization of negative pressure generated by compression and pumping of fuel fluid during fuel filling that the space formed by the fuel filling nozzle, vessel and waste solution nozzle be a hermetically sealed space.

Another feature of the present invention is that a fuel vessel provided in the above fuel filling/waste solution recovery apparatus includes at least a fuel room which stores fuel, and a waste room which houses residual material after use of the fuel, and the fuel room and the waste room are separated by a partition which can vary the volume ratio of the fuel room and the waste room.

Other features of the present invention will be described in "Best Mode for Carrying out the Invention."

Effect of the Invention

According to the present invention, it is possible to provide a fuel filling/waste solution recovery apparatus which efficiently recovers the dehydrogenation product derived from the use of hydrogen storage material fuel.

BRIEF DESCRIPTION OF DRAWINGS

FIG. 5 is a view showing a table which contains various data.

FIG. 16 is a view showing an example of data stored in a data storage device.

FIG. 18 is a view showing an example of a fuel filling/waste solution recovery apparatus in this embodiment.

DESCRIPTION OF REFERENCE NUMERALS

Figure 1:
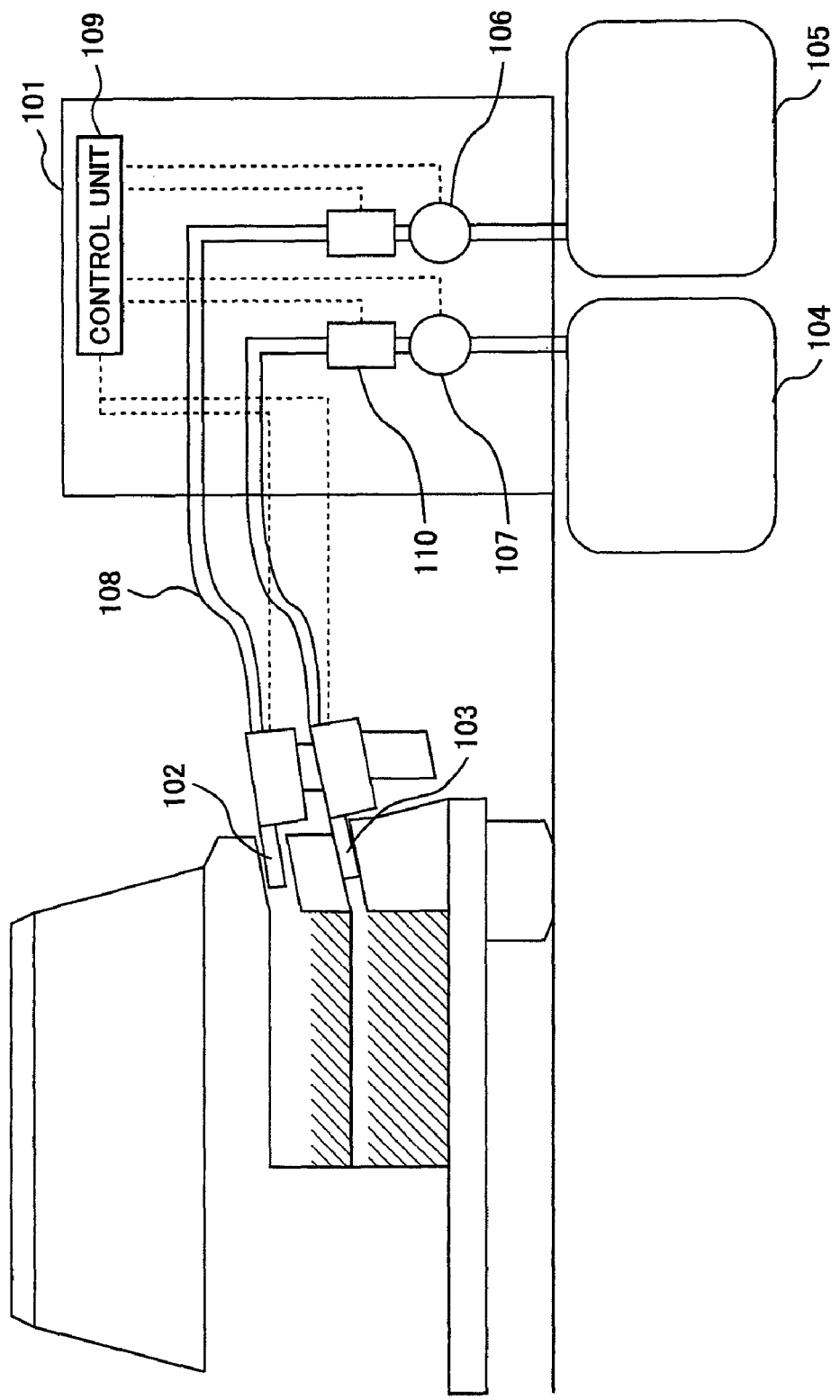
FIG. 1 is a view of the basic configuration of a fuel filling/waste solution recovery apparatus in this embodiment.

101 . . . Fuel filling/waste solution recovery apparatus
102 . . . Fuel filling nozzle
103 . . . Recovery nozzle
104 . . . Waste solution tank
105 . . . Fuel tank
106, 107 . . . Pumps
201 . . . Fuel filling apparatus
211 . . . Housing
212a . . . fuel tank
212b . . . waste solution tank
213 . . . Fuel filling nozzle
214 . . . Waste solution recovery nozzle
215 . . . Fuel filling hose
216 . . . Waste solution hose
217 . . . Fuel filling duct
218 . . . Waste solution duct
219, 220 . . . Insertion ducts
222 . . . Fuel filling pump
223 . . . Flow meter
224 . . . Display
225 . . . Control unit

BEST MODE FOR CARRYING OUT THE INVENTION

In this embodiment, the consumer of a hydrogen storage material is a car or stationary facility which uses hydrogen as a source of power.

A car which uses hydrogen as a source of power is a so-called hydrogen-fueled car which runs by generating electric power by a hydrogen fuel cell to run a motor or by converting reciprocating motion into revolving motion by explosion of hydrogen gas in an engine room; in either type, it is necessary to install a hydrogen storage device in part of the car body. Except when the fuel to be supplied to the hydrogen storage device is pure hydrogen physically compressed and occluded or liquefied, a hydrogen supply device is needed and since the present invention uses a hydrogen storage material with chemically occluded hydrogen as fuel, a hydrogen supply device is needed.

The hydrogen supply device is a hydrogen supply device which has a hydrogen separation membrane adjacent to a catalyst layer and separates and recovers generated hydrogen through the hydrogen separation membrane. The catalyst used is composed of a metal catalyst and a catalyst carrier, where the metal catalyst is at least one kind of metal selected from among nickel, palladium, platinum, rhodium, iridium, ruthenium, molybdenum, rhenium, tungsten, vanadium, osmium, chrome, cobalt and iron and the catalyst carries is at least one kind of compound selected from among alumina, zinc oxide, silica, zirconium oxide, diatom earth, niobium oxide, vanadium oxide, activated carbon, zeolite, antimony oxide, titanium oxide, tungsten oxide and iron oxide.

The hydrogen storage material used in the present invention is one of the following: benzene, toluene, xylene, mesitylene, naphthalene, methylnaphthalene, anthracene, biphenyl, phenacelene, and one of their alkyl substituents, or an aromatic compound as a combination of any of them or an ammonia aqueous solution, a hydrazine aqueous solution, or sodium borate. Also, an oxygen hydrogen storage material as a mixture of ammonia or hydrazine aqueous solution and hydrogen peroxide is used as a fuel.

When cyclohexane as the hydrogen storage material is sprayed over the catalyst layer in the hydrogen supply device, the cyclohexane ($C_6H_{12}$) is decomposed into hydrogen ($3 \times H_2$) and benzene ($C_6H_6$) by the action of catalyst and heat. The hydrogen and the benzene are separated by the hydrogen separation membrane into a gas and a solution and the benzene as the solution is recovered as a waste solution into the fuel tank and the gaseous hydrogen as fuel is supplied to the fuel cell or engine. Here, the recovered waste solution may contain cyclohexane which has not emitted hydrogen.

By adding hydrogen ($3 \times H_2$), the waste solution (benzene ($C_6H_6$)) recovered in the recovery tank turns into cyclohexane ($C_6H_{12}$) which can be again used as a hydrogen storage material.

The hydrogen supply device according to this embodiment needs a supply tank which stores a hydrogen storage material as fuel; a recovery tank which stores recovered residual material after extraction of hydrogen by decomposition of the fuel; and a device which recovers the waste solution recovered in the tank. In the past years, materials used as fuels have not required waste solution recovery because they completely burn gasoline, diesel oil, kerosene, city gas and LPG. However, when a hydrogen storage material which features safeness and less $CO_2$ emissions is supplied, an infrastructure for waste solution recovery is needed.

FIG. 1 shows the basic configuration of a fuel filling/waste solution recovery apparatus in this embodiment. A fuel filling/waste solution recovery apparatus 101 includes: a fuel filling nozzle 102 which supplies fuel to a machine which uses the fuel; a recovery nozzle 103 which recovers waste solution; a waste solution tank 104 which stores waste solution; a fuel tank 105 which stores the fuel to be supplied; a pump 106 which pumps up fuel from the fuel tank and sends it to the fuel tank of the machine through the fuel filling nozzle; and a pump 107 which sucks waste solution from the waste solution tank of the machine through the recovery nozzle and sends the waste solution to the waste solution tank. The flow path 108 used to supply fuel from the fuel tank to the machine and the one used to recover the waste solution from the machine into the waste solution tank each include at least a nozzle, a pump, and a rubber, metal or plastic pipe or hose. However, other pipe or hose materials may be used. A means to measure the volume of recovered fuel waste solution and the volume of supplied fuel, such as a flow meter 110, may be connected. The nozzles, pumps and means to measure the volumes of recovered waste solution and supplied fuel are electrically connected with a control unit 109. For the tanks, valves and pumps described here, the ones in fuel filling apparatus used at gas stations may be used.

Next, embodiments of the present invention as functionally expanded versions of the basic configuration will be described in detail referring to drawings.

First Embodiment

Figure 2:
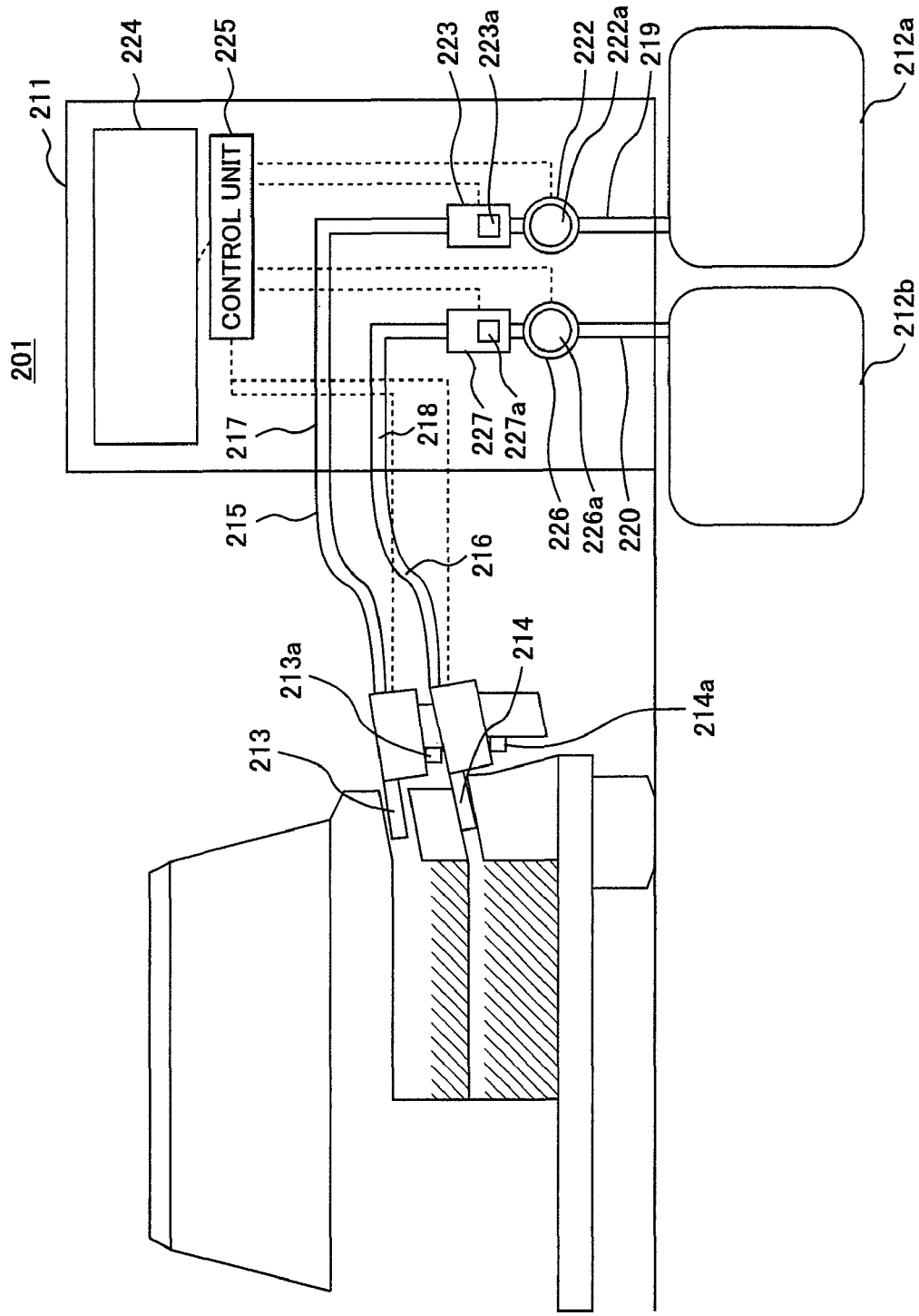
FIG. 2 is a schematic diagram showing an organic hydride dispenser for cars according to this embodiment.

FIG. 2 is a schematic view showing an organic hydride dispenser for cars according to this embodiment. As shown in FIG. 2, a fuel filling apparatus 201 has a housing 211 which supplies fuel such as gasoline to the fuel tank (not shown) of a car, fuel tank 212a for supplying fuel to the housing, a waste solution tank 212b, a fuel filling nozzle 213, and a waste solution recovery nozzle 214. A fuel filling hose 215 and a waste solution hose 216 which are connected with the fuel filling nozzle 213 and waste solution recovery nozzle 214, are drawn from a side face of the housing of the fuel filling apparatus 201.

As a customer's car arrives at a fuel filling station, a worker at the fuel filling station puts the fuel filling nozzle 213 into the fuel filling port in the car's fuel tank (to which fuel is to be supplied).

The housing 211 houses a fuel filling duct 217 and a waste solution duct 218 continuously connected with the fuel filling hose 215 and waste solution hose 216 where the lower end of the fuel filling duct 217 is connected with insertion duct 219. And the lower end of the waste solution duct 218 is connected with insertion duct 220 which is inserted in a waste solution tank 212b.

A fuel filling pump (fuel delivery means) 222 for sucking fuel from the fuel tank 212a and a flow meter 223 for measuring the volume of supplied fuel are provided on the fuel filling duct 217 in the housing 211.

The flow meter 223 is, for example, a reciprocating piston volumetric flow meter which is designed to convert the volume of sucked fuel into a flow rate and output a flow pulse (flow signal) through a flow pulse transmitter 223a.

The waste solution from the waste solution recovery nozzle 214 sucked by a waste solution recovery pump 226 via the waste solution hose 216 and waste solution duct 218 is collected in the waste solution tank 212b. A flow meter 227 provided in the waste solution path 218 output a flow pulse through a flow pulse transmitter 227a.

By installing a filter or strainer in the ducts, even if foreign matter in the fuel tank 212a is sucked into the insertion duct 219, it can be prevented from being sucked into the fuel filling pump 222.

A display 224 for showing the volume of supplied hydride and the volume of recovered waste solution is located on the front face of the housing 211. Inside the housing 211 is a control unit 225 which controls various devices.

The control unit 225 is electrically connected with the nozzle switches 213a, 214a located on the above nozzles or elsewhere, a pump motor 222a for driving the fuel filling pump 222, the flow pulse transmitter 223a which outputs flow pulses proportional to the flow rate measured by the flow meter 223, and the display 224.

And a pump motor 226a driving the waste solution recovery pump 226, and the flow pulse transmitter 227a are also connected to the control unit 225.

Upon receiving signals from the nozzle switches 213a, 214a, the control unit 225 calculates the volume of supplied fuel by integration of flow pulse signals from the flow pulse transmitter 223a and shows it on the display 224. At the same time, the control unit 225, upon receiving signals from the nozzle switches 213a, 214a, calculates the volume of recovered waste solution by integration of flow pulse signals from the flow pulse transmitter 223a and shows it on the display 224.

Figure 3:
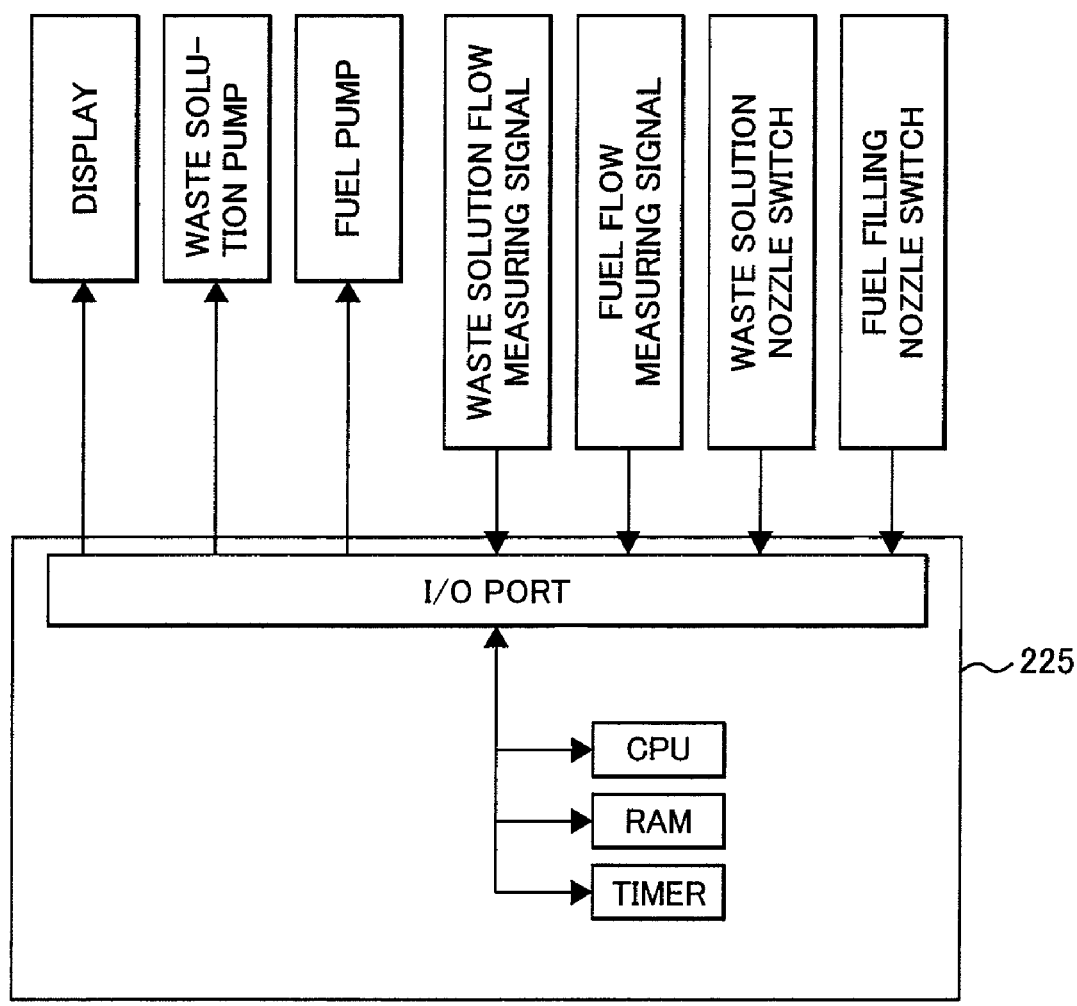
FIG. 3 is a block diagram showing the configuration with various components.

FIG. 3 is a block diagram showing the configuration with various components.

As shown in FIG. 3, the control unit 225 has an I/O (input/output) port which sends control signals to the fuel filling and waste solution recovery pump motor and display and receives input signals from the flow pulse transmitter and nozzle switches.

Also the control unit 225 has: a CPU (central processing unit) which performs, according to input signals received through the I/O port, various data processing tasks including monitoring, decision, warning, fuel filling control, fuel filling time measuring, measurement result display and reference discharge setting processes which will be stated later; a ROM which stores CPU processing programs, a RAM which is used a work area for data processing by the CPU, and a timer for time measurement.

The flow pulse transmitter is, for example, a rotary encoder and mechanically coupled with the rotary shaft (not shown) of the volumetric flow meter and outputs pulses synchronous with the revolution speed of the rotary shaft of the flow meter. The output pulse rate is pre-adjusted, for example, to 50 pulses/revolution though it varies depending on the flow pulse transmitter specification.

The instantaneous flow rate can be calculated by counting flow pulses (flow signals) from the flow pulse transmitter. This instantaneous flow rate is obtained by conversion of the number of pulses outputted per unit time into a flow rate, where the unit time is an arbitrarily set numerical value; for example, the instantaneous flow rate may be expressed in terms of fuel supplied in a second (L/sec) or in a minute (L/min).

A total flow volume can be outputted by integration of flow data at each time by the CPU. The total flow volume is stored in the RAM and its value is shown on the display all the time or at regular time intervals. Flow calculations can be made for both fuel filling and waste solution recovery simultaneously.

When the apparatus according to this embodiment is installed at a fuel filling station for cars which use hydride as fuel, fuel filling and waste solution recovery can be made simultaneously in a smaller space. In other words, a dehydrogenation product derived from the use of a hydrogen storage material for fuel can be recovered efficiently.

This embodiment is applicable not only to a stationary apparatus but also to a mobile fuel filling apparatus such as a tank truck.

Second Embodiment

Next, an embodiment in which a data storage device is attached to the apparatus in the first embodiment to load data as necessary to calculate total fuel cost or the like will be described.

Figure 4:
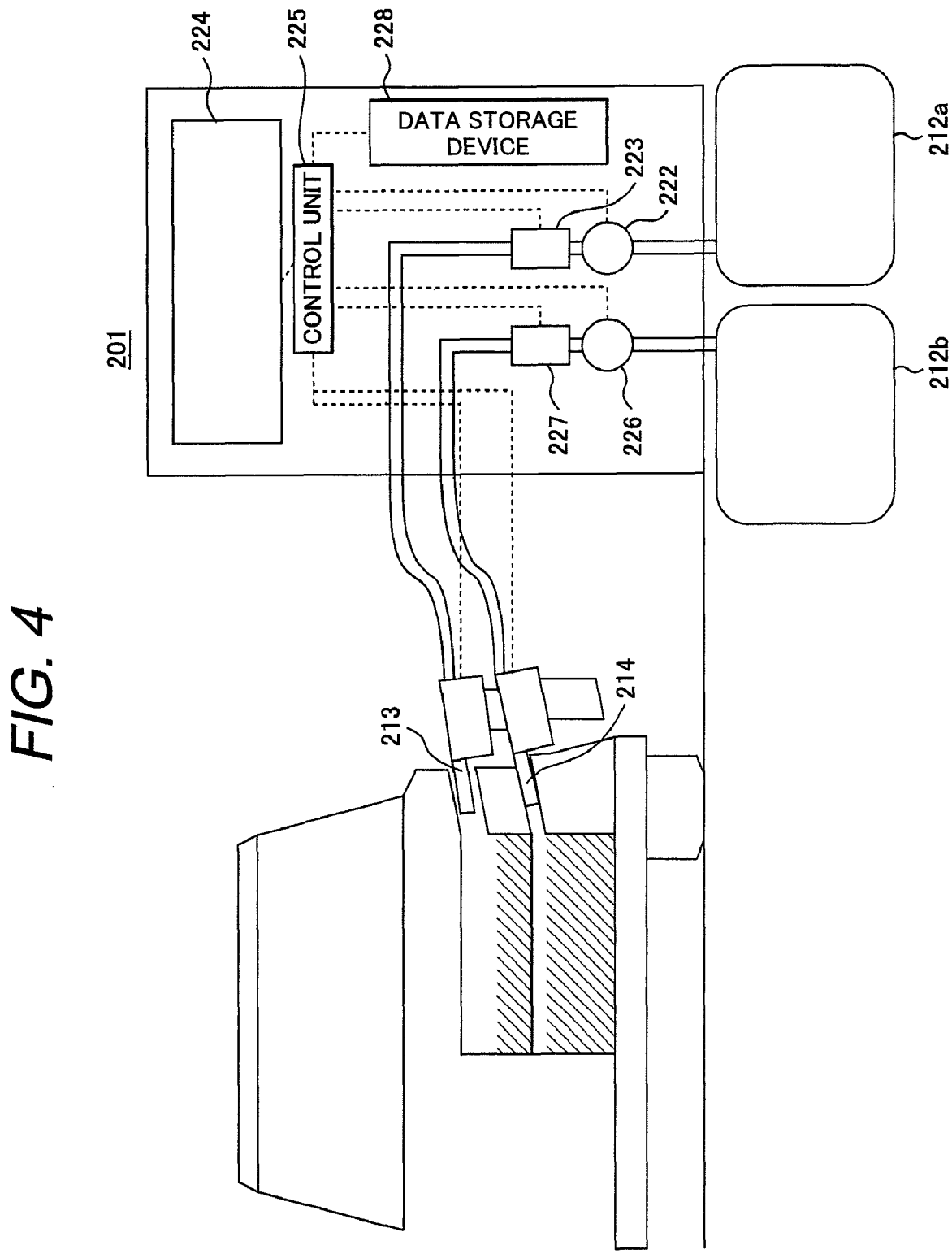
FIG. 4 is a schematic view of an organic hydride dispenser for cars which is equipped with a data storage device according to this embodiment.

FIG. 4 is a schematic view of an organic hydride dispenser for cars which is equipped with a data storage device 228 according to this embodiment. Here, in addition to the configuration in the first embodiment, the data storage device 228 is electrically connected with the control unit 225 so that the CPU can access data. The stored data includes fuel unit price (yen/L), waste solution unit price (yen/L), hydrogen content ($m^3$/L), waste solution treatment unit price (yen/L), and carbon tax (yen/L). Individual data pieces are managed on a daily basis by ID and tabularized, for example, as shown in FIG. 5.

For example, in the apparatus according to the present invention, if 35 liters of hydride is supplied and the same volume of waste solution is recovered on Dec. 15, 2010, the CPU will extract the corresponding unit price for that date and multiply the result of integration of supplied fuel and waste solution flow data by it as follows to calculate the fuel price (=35 (L)×64 (yen/L)=2240 yen). The calculated fuel price 2240 yen will be stored in the RAM and can be shown on the display. The waste solution can also be priced similarly: waste solution price=35 (L)×20 (yen/L)=700 yen. If the fuel distributor which sells hydride purchases waste solution at a rate of 20 yen per liter, the fuel consumer must pay the difference between the fuel price and the waste solution price. The CPU extracts relevant data from the RAM to calculate the amount which the fuel consumer must pay and records it in the RAM. The fuel price=2240 yen, waste solution price=700 yen, and billing price=1540 yen can be shown on the display at a time.

Furthermore, if a wireless or wire communication device is installed and connected with the control unit to enable communications via the Internet, the data in the data storage device can be revised as needed. When the apparatus according to this embodiment receives new information from an information source, it sets a new ID in the table of FIG. 5 and enters new information. This makes it possible to update tax or similar information at any time. Such information can also be manually entered by connecting an external input device to the communication device. Also, the location of an external storage device is not limited to what is suggested in this embodiment. For example, a communication device which can be connected with the Internet may be attached to the dispenser to access a data storage device in the server, which is also in the scope of the present invention.

Third Embodiment

This embodiment is an example of a fuel filling/waste solution recovery apparatus in which an ultraviolet spectral sensor is attached to the tip of the waste solution nozzle of the fuel filling/waste solution recovery apparatus according to the present invention to permit quantification of the volume of hydride in the waste solution.

Figure 6:
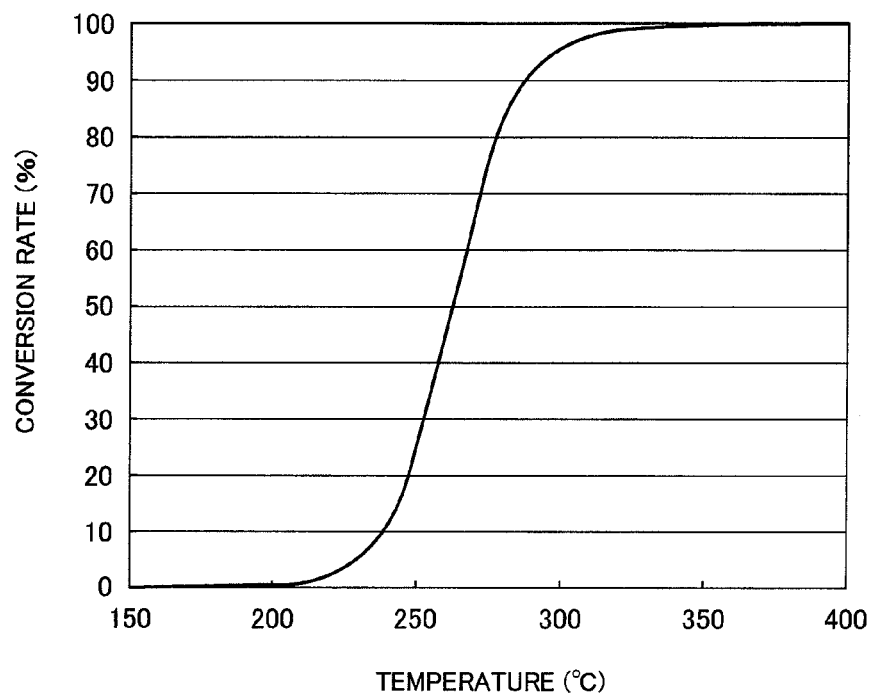
FIG. 6 is a view showing the average conversion rate of methylcyclohexane which varies according to temperature.

When the fuel filling/waste solution recovery apparatus shown in FIG. 4 recovers waste solution from a machine which uses fuel, the recovered waste solution is likely to contain unreacted fuel. FIG. 6 shows the average conversion rate of methylcyclohexane which varies according to temperature. When the reaction environment is heated to 300° C. or more, virtually 100% conversion of methylcyclohexane takes place, emitting hydrogen. However, when the reaction environment is below 300° C., the conversion rate rapidly declines. At start of the machine which uses fuel, the temperature does not reach 300° C. and even at 300° C. or more, depending on the volume of hydride sprayed on the catalyst, the catalyst surface may be cooled, which may cause the rate of reaction to decline and the hydride to remain unconverted or become a waste solution. Although the unreacted hydride is recovered together with waste solution, the fuel consumer is considered to have lost money for the unreacted hydride. This embodiment shows a technique to quantify the volume of unreacted hydride in the waste solution.

Figure 7:
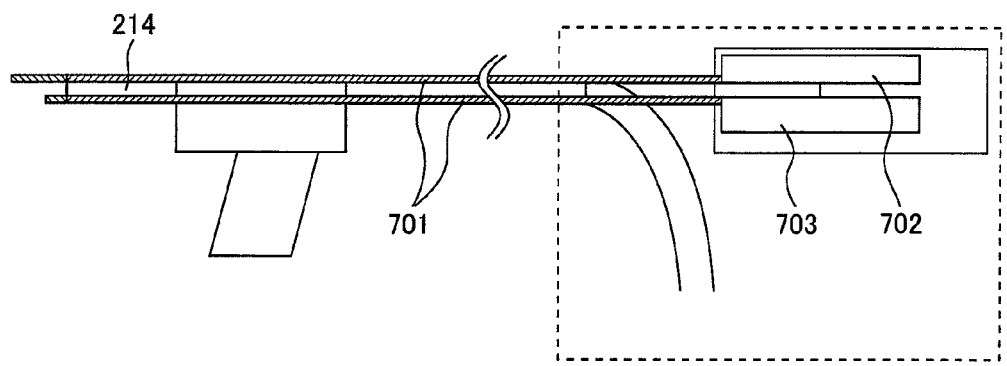
FIG. 7 is a view showing an example of the configuration of a fuel filling/waste solution recovery apparatus with a waste solution analysis function.

FIG. 7 shows an example of the configuration of a fuel filling/waste solution recovery apparatus with a waste solution analysis function. In the fuel filling/waste solution recovery apparatus with a waste solution analysis function, an ultraviolet radiator 702 and a light detector 703 are installed in part of the waste solution recovery nozzle 214 and a light source and a spectroscope are installed in its housing and another place. The light source and ultraviolet radiator are connected with the spectroscope and light detector through an optical fiber 701. It is desirable to use a heavy hydrogen lamp as the light source and a photomultiplier or photodiode as the light detector and a silica tube as the optical fiber, though not limited thereto. The light source, spectroscope and control unit are electrically connected with each other. The data storage device stores, in addition to the information described in the second embodiment, at least information on the name of a hydride adopted as fuel, volume of hydrogen per unit volume, absorption wavelength, classification between hydride and dehydrogenation product in the form of a hydride physical property table and also stores a fuel table which contains information on composition ratios of compounds in the fuel.

Figure 8:
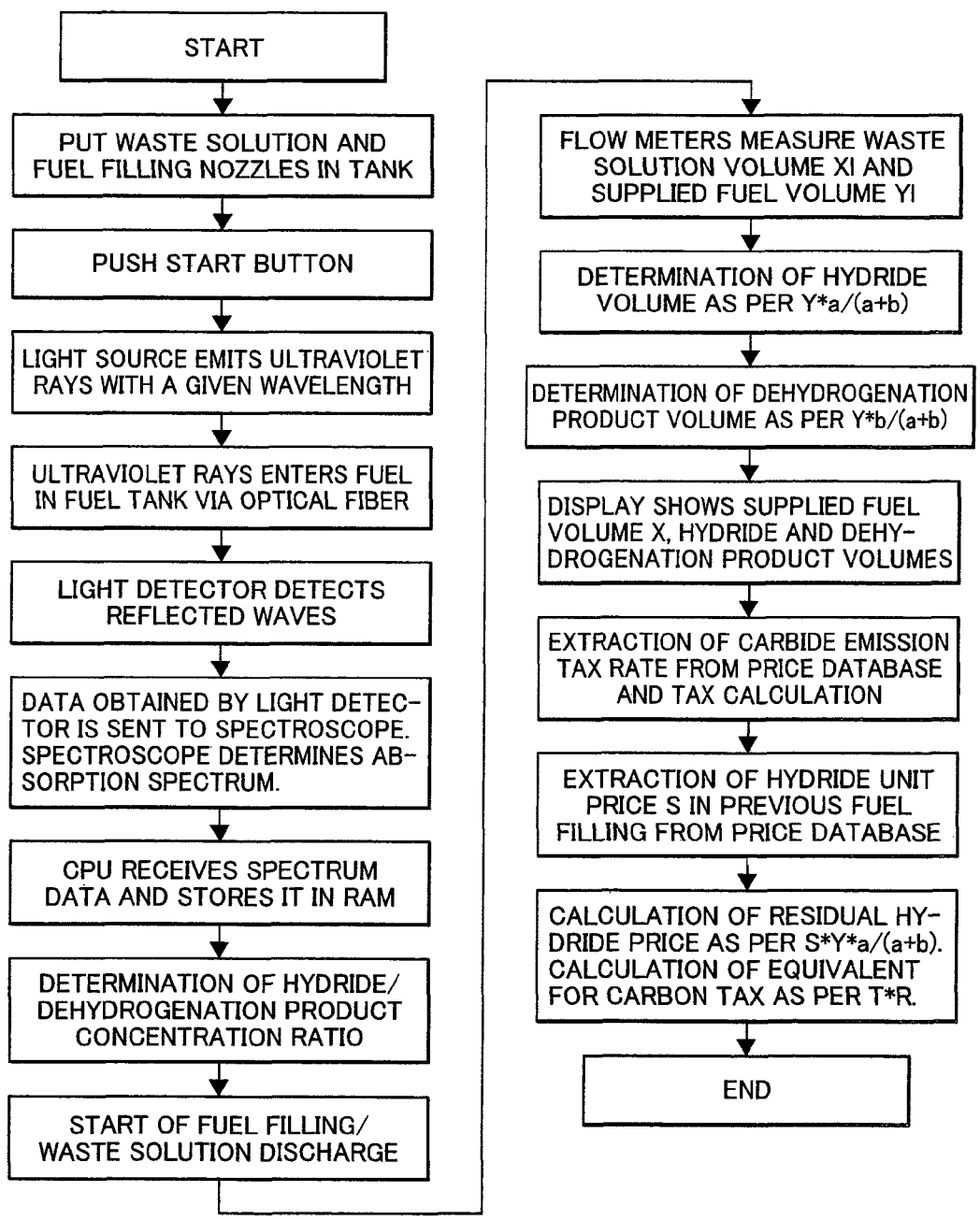
FIG. 8 is a view showing a flow of steps for waste solution analysis and waste solution pricing.

FIG. 8 shows a flow of steps for waste solution analysis and waste solution pricing. Next, referring to FIG. 8, analysis is started by placing the waste solution nozzle in the waste solution tank of the machine and pushing the start button. As analysis starts, light with a given wavelength range is emitted from the light source and passed through the optical fiber and emitted from the ultraviolet radiator provided with the waste solution recovery nozzle and detected by the light detector by the medium of the waste solution in the tank. It is desirable that the ultraviolet radiator and light detector be as distant from each other as possible. The light detected by the light detector passes through the optical fiber and enters the spectroscope. The entered data is converted into an absorption intensity for a light wavelength which is then conveyed from the spectroscope to the CPU and turned into tabular data to be sent to the RAM. For example, if cyclohexane is used as a hydride, the dehydrogenation product is benzene which has an absorption wavelength of 261 (nm). The absorption wavelength of cyclohexane as a hydride (unreacted) is 280 (nm).

As light with a wavelength is radiated, absorption of light occurs. The amount of absorption of light is almost proportional to the quantity of each material. By searching absorption wavelength data in the hydride physical property table for the wavelength concerned, the name of the compound which has absorbed light and whether it is a dehydrogenation product or hydride are known. As for a waste solution in which dehydrogenation product and hydride coexist, the concentration ratio in the waste solution is known from the intensity ratio of wavelength absorption peaks. Even when the hydride supplied as fuel is a mixture of solutions with different properties, the volume of dehydrogenation product is known by radiating light with plural wavelengths and checking plural absorption peaks.

Figures 9, 10:
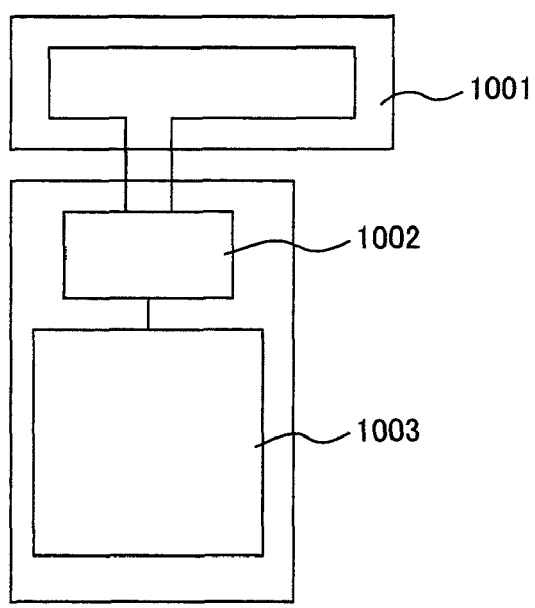
FIG. 9 is a diagram showing data concerning hydride and dehydrogenation product.
FIG. 10 is a view showing an example of a memory with a communication function.

Once the absorption peak ratio is determined and the data is stored in the RAM, waste solution recovery is started. Once the volume of waste solution is determined, the CPU extracts the volume of waste solution and the concentration ratio from the RAM and multiplies the volume of waste solution by the concentration ratio to determine the volume of dehydrogenation product and the volume of hydride. For example, if the intensity ratio (dehydrogenation product:hydride) is 2:1 and the volume of waste solution is 45 liters, the dehydrogenation product's ratio 0.66 (=2/3) and the hydride's ratio 0.33 (=1/3) are stored together with a processing ID as shown in FIG. 9. The stored data pieces are extracted and multiplied by the volume of waste solution 45 (L) to calculate the dehydrogenation product's price (=45 (L)×0.66=29.7 (L)) and the hydride's price (=45 (L)×0.33=14.9 (L)). The calculation results can be shown on the display.

As in the second embodiment, the dehydrogenation product's price (=29.7 (L)×20 (yen/L)=594 yen) and the hydride's price=14.9 (L)×59 (yen/L)=745 yen are calculated. At the same time, when 45 liters of hydride priced at 59 yen is supplied, the fuel price is 2655 yen (=45 (L)×59 (yen/L). The CPU extracts relevant data from the RAM and calculates the amount which the fuel consumer must pay and records it in the RAM. The display can show the volume of purchased fuel 45 L, fuel price=2655 yen, volume of recovered waste solution 45 L, waste solution price=668.5 yen and billing price=1987 yen at a time. Also the volume of hydride and the volume of dehydrogenation product in the waste solution can also be shown simultaneously.

If a mixture of plural types of hydrides is used as fuel, the volumes of hydride and dehydrogenation product are identified by multiplication by the volume ratios in the fuel.

Fourth Embodiment

This embodiment is an example of a fuel filling/waste solution recovery apparatus in which a memory storing average performance data of catalyst pertaining to a machine which uses fuel is installed in part of the machine to make data communications with the fuel filling/waste solution recovery apparatus according to the present invention to make an approximate estimation of the volume of hydride in the waste solution. Next is an example of this embodiment in which the machine which uses fuel is a car.

FIG. 10 shows an example of a memory with a communication function. This memory is, for example, composed of an antenna 1001, communication circuit 1002, and memory 1003 like an RFID (Radio Frequency Identification) tag and can transmit data contactlessly. The communication circuit has a wireless communication function. It is possible to allow only a specific communication device to make communications by storing the information showing the identifier previously assigned to it in the memory.

It is desirable that the effective wireless coverage of the RFID be as narrow and short as possible in order to prevent interference. For example, the distance between the RFID and the antenna of a device going to communicate with it should be 1 m or less or desirably several centimeters or less. Therefore, a marking which visibly shows the area where the above can be done should be provided in part of the machine with the RFID attached thereto or in its vicinity. If possible, it is desirable that the RFID should exist in the marked area. The catalyst performance data is stored in a tabular form in the memory. The table contains the type of catalyst, date of its manufacture, its average fuel conversion rate. It is also possible to insert the conversion rate at start of the machine, conversion rate in each season and conversion rate with change since the date of manufacture taken into consideration.

Figure 11:
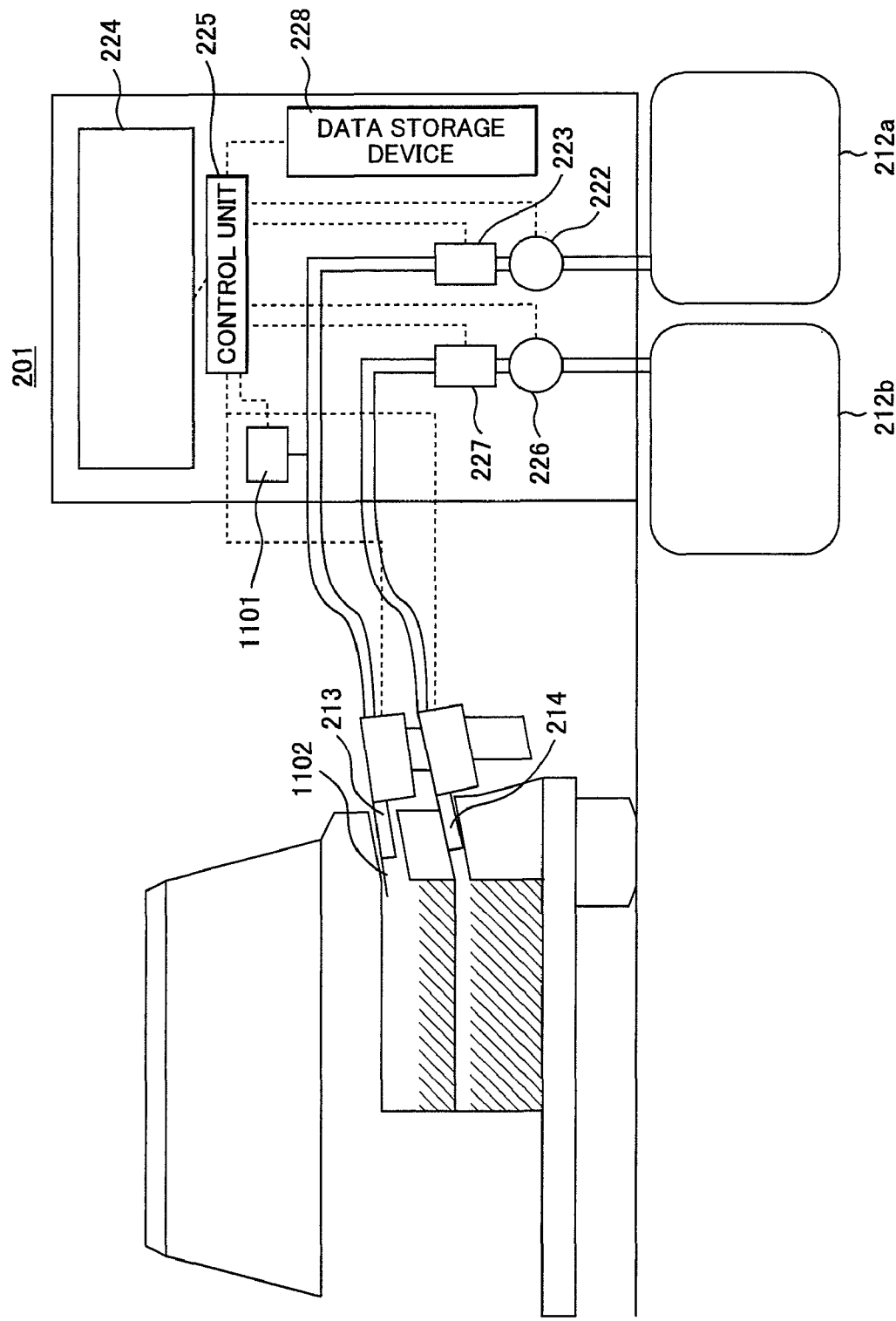
FIG. 11 is a view showing an example of a fuel filling/waste solution recovery apparatus with a wireless communication function.

FIG. 11 shows an example of a fuel filling/waste solution recovery apparatus with a wireless communication function. The fuel filling/waste solution recovery apparatus in this embodiment is characterized that it has a wireless communication host 1101 and part of either of the fuel filling and recovery nozzles has a wireless communication host or wireless communication host antenna 1102. The wireless communication host is electrically connected with the control unit of the fuel filling/waste solution recovery apparatus to enable the CPU to access data. Furthermore, a data storage device may be provided.

Figure 12:
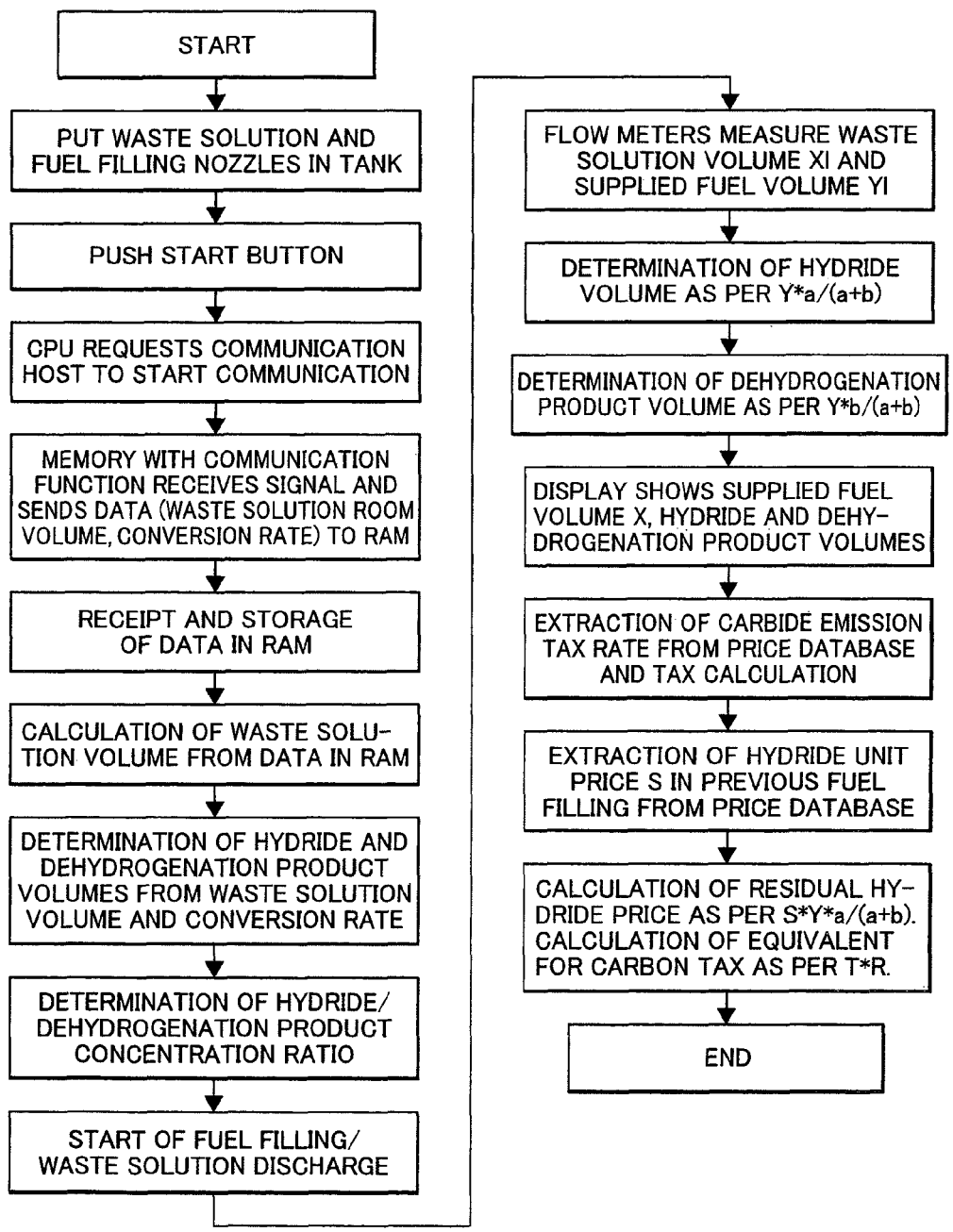
FIG. 12 is a view showing a flow of steps to determine the price of waste solution recovery.

FIG. 12 shows a flow of steps in which the above configuration is used to estimate the volume of dehydrogenation product in the waste solution from the car and determine the recovered waste solution price. Next, referring to FIG. 12, a waste solution pricing process will be described.

The waste solution nozzle is placed in the waste solution tank of the machine and the start button is pushed. At the same time, a trigger signal flows from the CPU to the wireless communication host which arbitrarily generates electromagnetic waves. The electromagnetic waves are radiated on the memory with a communication function and the data in the memory is passed through the communication circuit and transmitted. The data transmitted from the memory is stored in the RAM of the fuel filling/waste solution recovery apparatus through the wireless communication host. Once the data is stored in the RAM, waste solution recovery is started. At this time, waste solution volume data from a flow meter is also stored in the RAM. Once the volume of waste solution is determined, the CPU extracts the catalyst performance (conversion rate) and the volume of waste solution from the RAM and multiplies the volume of waste solution by the conversion rate to determine the volume of dehydrogenation product and the volume of hydride. For example, if the conversion ratio is 0.75 and the volume of waste solution is 45 liters, the volume of waste solution 45 (L) is multiplied by the conversion rate 0.75 to calculate the volume of dehydrogenation product (=45 (L)×0.75=33.75 (L) and the volume of hydride (=45−33.75=11.25 (L)). The calculation results can be shown on the display.

In this embodiment, catalyst efficiency data is extracted from fuel in the recovered waste solution and supplied fuel and on the assumption that the volume of supplied fuel is equal to the volume of recovered waste solution, the above steps are taken so that the dehydrogenation product and hydride in the waste solution of the supplied fuel can be quantified and priced.

Here, the volume of dehydrogenation product and the volume of hydride are calculated using an average catalyst performance and approximate values. If the memory stores data for each situation such as the conversion rate at start, conversion rate in each season and conversion rate with change since the date of manufacture taken into consideration, more accurate values can be obtained by extracting suitable data for each situation.

Furthermore, if various sensors are installed in the car to acquire travel data such as start time, number of starts and accelerator opening degree and the data are stored in the memory, a more accurate volume value of dehydrogenation product can be obtained by loading the data during waste solution recovery.

As in the second embodiment, when a data storage device storing the unit prices of dehydrogenation product and hydride is provided, the dehydrogenation product's price (=33.75 (L)×20 (yen/L)=675 yen) and the hydride's price=11.25 (L)×59 (yen/L)=664 yen can be calculated. The CPU extracts relevant data from the RAM and calculates the amount of money which the fuel consumer must pay and records it in the RAM. The display can show the volume of recovered waste solution 45 L and the price of waste solution=1339 yen at a time. Also the volume of hydride and the volume of dehydrogenation product in the waste solution can also be shown simultaneously.

Fifth Embodiment

This embodiment is an example of a fuel filling/waste solution recovery apparatus with a function which, when the fuel or dehydrogenation product burns with catalyst temperature rise, quantifies its volume and determines the price of what has burned. Next is such an example in which the machine which uses fuel is a car.

Figure 13:
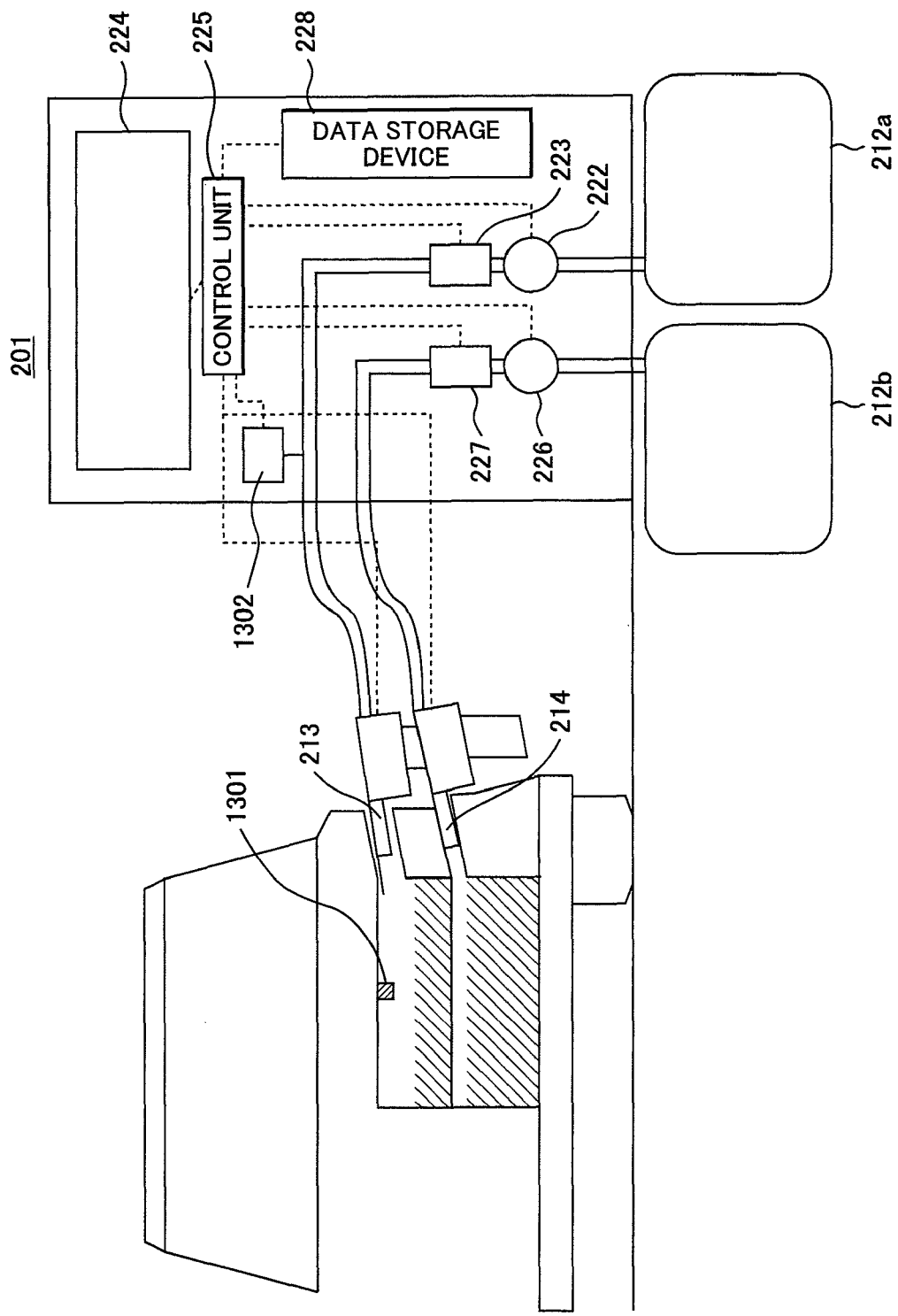
FIG. 13 is a view showing the configuration of a fuel filling/waste solution recovery apparatus.

This embodiment employs a fuel filling/waste solution recovery apparatus as shown in FIG. 13 which includes, in addition to the configuration in the third embodiment, a remaining fuel quantity control device 1301 installed in the machine and a communication host 1302 to receive data from the remaining fuel volume control device. Preferably the communication host should be located on the waste solution recovery or fuel filling nozzle, and it is electrically connected with the control unit of the fuel filling/waste solution recovery apparatus to enable the CPU to access data. A data storage device may also be provided.

Figure 14:
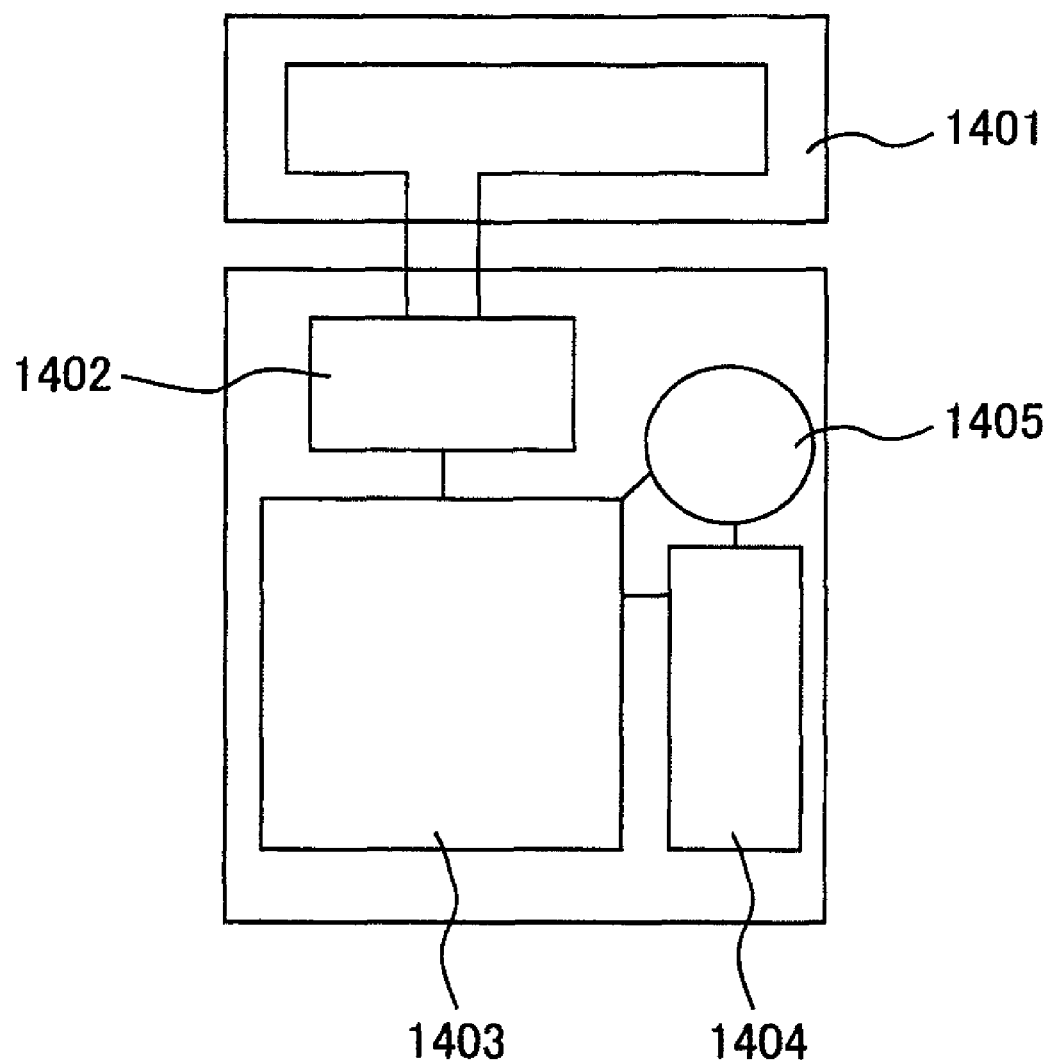
FIG. 14 is a view showing an example of a remaining fuel quantity control device of a car fuel tank.

FIG. 14 shows an example of the remaining fuel quantity control device of a car fuel tank.

The remaining fuel quantity control device is composed of a communication antenna 1401, a communication circuit 1402, a memory 1403 and a position measuring means 1404 and installed in a car fuel tank to measure the solution level of fuel or the like and calculate the quantity of remaining fuel. For example, if an optical position sensor is used for the remaining fuel quantity control device, a light generator 1405 is attached in an upper part of the fuel tank where a sensor with a given area coated uniformly with a material to generate voltage according to light intensity is so located on the solution surface as to face the light source all the time and upon contact with the solution surface, voltage according to light intensity is generated. Since the potential at a point distant from the spot declines due to the membrane material's resistance, the light spot sensor position can be detected based on the ratio of voltages generated at both ends of the sensor. The solution level is measured in this way. However, the method of solution level measurement is not limited to this method. In this case, the communication antenna, communication circuit and memory are connected with the sensor on the solution level. The memory stores machine ID, current solution level, tank cross-section area, fuel quantity history and so on. If a calculation capability such as a CPU is added to this device, the remaining fuel quantity in the tank can be added to the memory. It is desirable to assign machine IDs to individual machines, though not so limited.

The fuel filling/waste solution recovery apparatus should have a dehydrogenation product quantification and measurement function as shown in the third embodiment and a wireless communication function as shown in the fourth embodiment.

Figure 15:
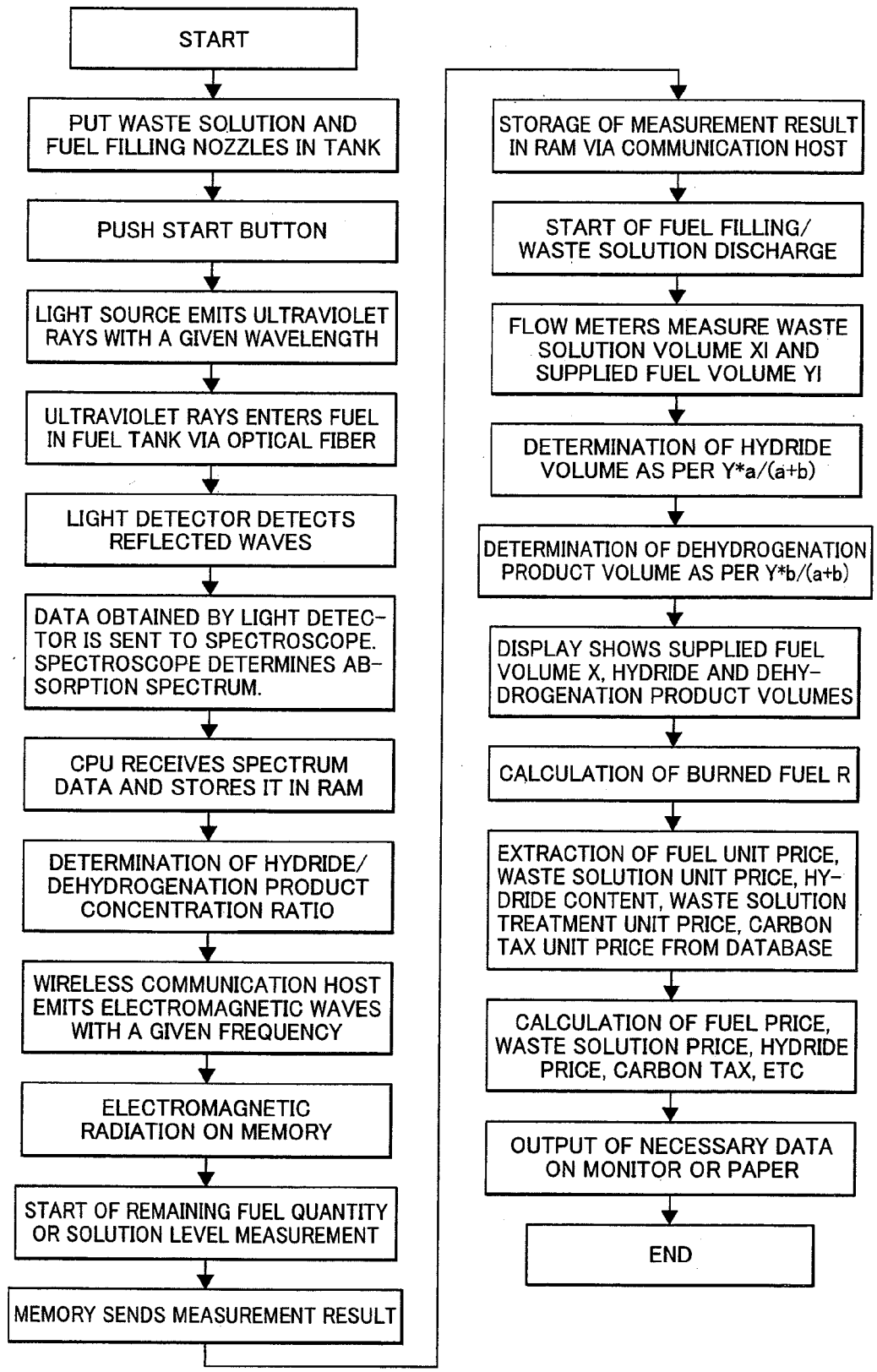
FIG. 15 is a view showing a flow of steps to determine the waste solution price.

FIG. 15 shows a flow of steps to estimate the volume of dehydrogenation product in the waste solution from a car and determine the waste solution price. Next, the waste solution loss quantification method and waste solution pricing method will be described referring to FIG. 15. The waste solution nozzle and fuel filling nozzle are placed in the waste solution tank and fuel tank of the machine and the start button is pushed. The CPU determines the concentration ratio of dehydrogenation product and hydride in the waste solution by dehydrogenation product quantification and measurement means provided in the waste solution nozzle.

The concentration ratio data is stored in the RAM of the fuel filling/waste solution recovery apparatus. At the same time, a trigger signal flows from the CPU to the wireless communication host provided on the fuel nozzle and the wireless communication host generates electromagnetic waves with a given frequency. As the electromagnetic waves are radiated on the memory with a communication function. As the antenna is radiated with electromagnetic waves, the optical sensor is triggered or started and the current solution level l is stored in the memory. At the same time, at least solution level l, previous fuel volume V and tank cross-section area A (preferably and machine ID) are extracted from the data in the memory and transmitted from the memory through the communication circuit. The data from the memory is transmitted through the communication circuit and stored in the RAM of the fuel filling/waste solution recovery apparatus. If the remaining fuel quantity control device does not have a calculation capability such as a CPU, the CPU of the fuel filling/waste solution recovery apparatus extracts the solution level l and tank cross-section area A from the RAM and calculates the remaining fuel quantity A×l and saves it in the RAM.

After the data is saved in the RAM, the pump is started and waste solution recovery and fuel filling are started. The volume of waste solution recovered from the tank X and the volume of fuel supplied to the tank Y are measured by a flow meter or the like and saved in the RAM.

The CPU calculates the volume of hydride and the volume of dehydrogenation product from the ratio of hydride and dehydrogenation product a:b and the volume of recovered waste solution X, all of which are stored in the RAM according to the third embodiment, using X×a/(a+b) and X×b/(a+b).

After fuel filling is finished, the pump is stopped and a signal is sent from the CPU through the communication host of the fuel filling nozzle. As the remaining fuel quantity control device in the tank of the machine receives this signal, the current solution level l' is measured by the sensor. The measured solution level is stored in the memory of the remaining fuel quantity control device and solution level l' data is transmitted from the memory through the communication circuit. The data from the memory is transmitted through the wireless communication host and stored in the RAM of the fuel filling/waste solution recovery apparatus.

After waste solution recovery and fuel filling are finished, data on previous fuel volume V, volume of recovered waste solution X, volume of supplied fuel Y, current tank fuel level l'×A are sent to the CPU to calculate fuel loss V+Y−(X+l'×A).

At the same time, l' A is calculated and the result is transmitted through the communication nozzle of the fuel filling nozzle. As the remaining fuel quantity control device in the tank of the machine receives this signal, it stores the data in the memory and transmits the stored and determined data signal. The data transmitted from the memory is received by the fuel filling/waste solution recovery apparatus through the wireless communication host.

From the data stored in the data storage device, data such as fuel unit price (yen/L), waste solution unit price (yen/L), hydrogen content ($m^3$/L), waste solution treatment unit price (yen/L), and carbon tax (yen/L) are extracted to calculate prices.

As hydride burns or fuel loss occurs, carbon dioxide is generated. When fuel loss occurs, the carbon tax is calculated according to (carbon tax unit price)*[V+Y−(X+l'*A)]. If the user is to pay the carbon tax, carbon tax unit price, carbon emission, money amount of carbon tax and other data are shown on the display. On the other hand, if another party such as the fuel distributor, car dealer or catalyst manufacturer is to pay the carbon tax, machine ID is added to the data to be read from the memory of the remaining fuel quantity control device so that it is correlated with calculation and loaded data.

This data is stored in the data storage device in a tabular form as shown in FIG. 16. When the fuel distributor stores this table, the distributor can confirm the money amount of carbon tax.

Furthermore, carbon tax can be billed to the car dealer by using a table which correlates machines ID with car names.

Furthermore, carbon tax can be billed to the catalyst manufacturer by using a table which correlates car names, dates of manufacture, components in use, and component manufacturers.

Sixth Embodiment

This embodiment is an embodiment which uses a fuel tank with a movable partition in order to perform waste solution recovery and fuel filling efficiently in the fuel filling/waste solution recovery apparatus according to the present invention.

A hydride fuel tank must store both fuel hydride and waste solution. The simplest way is to use two tanks, but if fuel filling and waste solution recovery are performed simultaneously, two pumps are needed. For this reason, a tank which can perform fuel filling and waste solution recovery simultaneously using one pump was fabricated.

Figure 17:
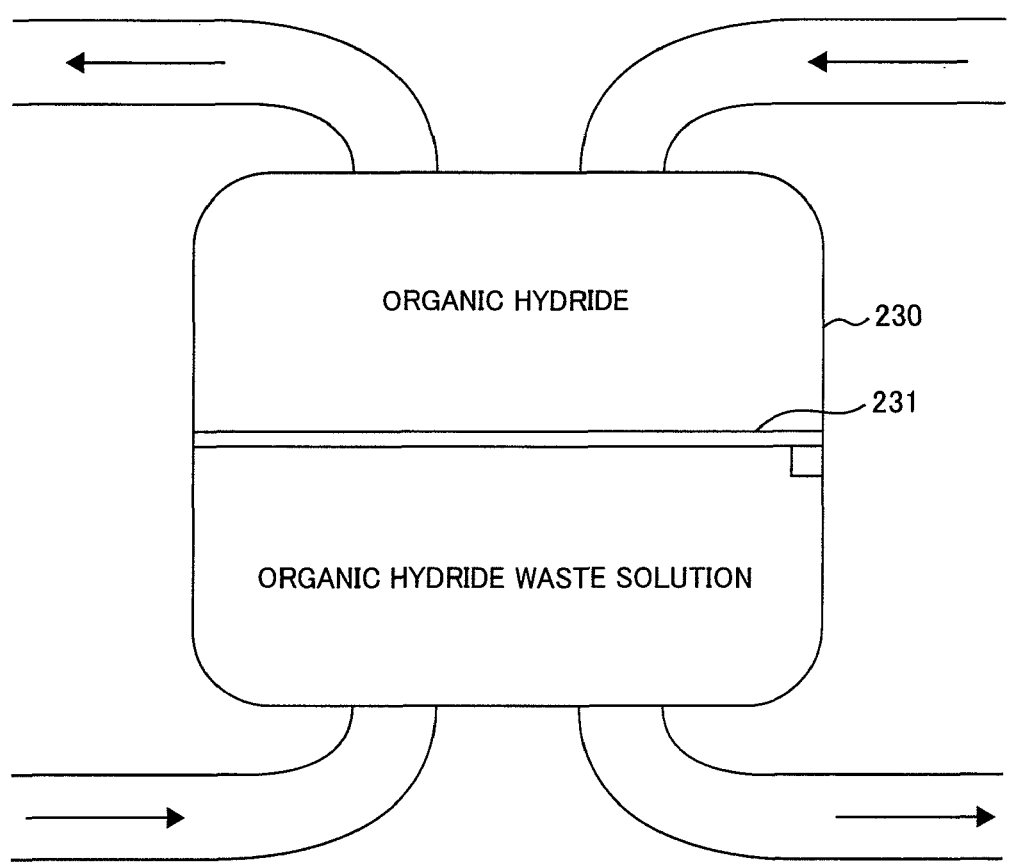
FIG. 17 is a view showing a fuel vessel.

As shown in FIG. 17, a movable partition 231 is placed in a hermetically sealed tank 230 so that fuel and waste solution can be separately stored in the tank 230. If the movable partition 231 moves vertically as the volume of fuel increases or decreases, a higher working efficiency is assured due to the effect of fuel weight, though its moving direction is not so limited. In this embodiment, the upper part is a fuel tank and the lower part is a waste solution tank. When a fuel filling nozzle and a waste solution recovery nozzle are placed in a fuel filling port and a waste solution recovery port, fuel filling and waste solution recovery routes are established while they are partitioned by the partition and as fuel filling through the fuel filling port is started, a force generated by fuel weight and pump pressure is applied to the movable partition and the waste solution is pushed out. The waste solution thus pushed out is recovered through the waste solution route into the waste solution tank.

When the above pump is used, pump pressure can be efficiently utilized and waste solution recovery and fuel filling can be simultaneously performed smoothly.

If a material which selectively allows hydride and dehydrogenation product to pass is used for the movable partition, the hydrogenation product in the waste solution can be moved into the fuel storage part, allowing efficient use of fuel.

Seventh Embodiment

This embodiment is an example of a fuel filling/waste solution recovery apparatus in which the waste solution recovery nozzle and fuel filling nozzle are located coaxially in order to increase working efficiency in waste solution recovery and fuel filling and save space.

FIG. 18 shows an example of a fuel filling/waste solution recovery apparatus in this embodiment. In FIG. 18, a fuel filling/waste solution recovery nozzle 240 has a fuel filling port with a diameter of 42 and a waste solution recovery port with a diameter of 30 coaxially located where the waste solution recovery port lies in the fuel filling port and waste solution flows inside the waste solution port. On the other hand, fuel flows between the outer wall of the waste solution port and the inner wall of the fuel filling port. The diameters of the fuel filling port and waste solution recovery port and their positional relation are not limited thereto. The fuel filling port and waste solution recovery port are connected with the housing of the fuel filling/waste solution recovery apparatus through rubber hoses or pipes and in the housing, the rubber hoses are connected with pumps installed in the housing through piping, constituting waste solution and fuel flow paths. It is desirable that the waste solution hose and fuel hose be located coaxially like the fuel filling port and waste solution recovery port, though not limited thereto, namely they may be separately located. A nozzle switch 241 is provided on the fuel filling/waste solution recovery nozzle 240 and electrically connected with the control unit and when the nozzle switch is pushed, the pumps are started and waste solution recovery and fuel filling are started simultaneously. The other elements are the same as in the fuel filling/waste solution recovery apparatus in the first embodiment.

Next is a processing flow in which this apparatus is applied for fuel filling and waste solution recovery in a car.

As a customer's car arrives at a fuel filling station, a worker at the fuel filling station puts the fuel filling/waste solution recovery nozzle into a fuel filling/recovery port in the car's fuel tank (to which fuel is to be supplied). The control unit is electrically connected with the nozzle switch located on the above nozzle or elsewhere, a pump motor for driving the fuel filling/waste solution recovery pump, a flow pulse transmitter which outputs flow pulses proportional to the flow rate measured by a flow meter, and a display.

Upon receiving a signal from the nozzle switch, the control unit calculates the volume of supplied fuel and the volume of recovered solution by integration of flow pulse signals from the flow pulse transmitter and shows them on the display. At the same time, the control unit, upon receiving a signal from the nozzle switch, calculates the volume of recovered waste solution by integration of flow pulse signals from the flow pulse transmitter and shows it on the display.

The instantaneous flow rate can be calculated by counting flow pulses (flow signals) from the flow pulse transmitter. This instantaneous flow rate is obtained by conversion of the number of pulses outputted per unit time into a flow rate, where the unit time is an arbitrarily set numerical value; for example, the instantaneous flow rate may be expressed in terms of fuel supplied in a second (L/sec) or in a minute (L/min).

A total flow volume can be outputted by integration of flow data at each time by the CPU. The total flow volume is stored in the RAM and its value is shown on the display all the time or at regular time intervals. Flow calculations can be made for both fuel filling and waste solution recovery simultaneously.

When the apparatus according to the present invention is installed at a fuel filling station for cars which use hydride as fuel, almost the same working procedure as with the conventional fuel filling apparatus can be used and the number of components can be decreased.

This embodiment is applicable not only to a stationary apparatus but also to a mobile fuel filling apparatus such as a tank truck.

Another possible approach is that waste solution is sucked from a hermetically sealed vessel, using the negative pressure generated by compression and pumping of the fuel fluid during fuel filling.

When the apparatus according to the present invention is installed at a fuel filling station for cars which use hydride as fuel, almost the same working procedure as with the conventional fuel filling apparatus can be used and the infrastructure for waste solution recovery can be improved at the same time.

According to the above embodiments, regarding hydrogen utilization technology which uses hydrogen storage materials, generated waste solution can be recovered efficiently and a higher efficiency in recirculation cycles of dehydrogenation and hydrogenation of hydrogen storage materials can be achieved by quantification and separation of unreacted hydrides, so that hydrogen storage materials can be supplied to fuel consumers at low cost.

The invention claimed is:

1. A fuel filling/waste solution recovery apparatus which supplies a hydrogen storage material to a fuel vessel of a machine fueled by hydrogen generated by dehydrogenation of a hydrogen storage material and recovers waste solution derived from dehydrogenation from a waste solution vessel, comprising:

a fuel filling nozzle and a waste solution recovery nozzle;

measuring means to measure a volume of the waste solution, analyzing means installed in the recovery nozzle for analyzing a concentration ratio of the dehydrogenation product and hydride in the waste solution which flow through the recovery nozzle;

a database storing a hydride unit price and a dehydrogenation product unit price; and calculating means for calculating a waste solution price based on the volume of the waste solution measured by the measuring means, the hydride unit price and dehydrogenation product unit price stored in the database and a concentration ratio of the waste solution analyzed by the analyzing means.

2. A fuel filling/waste solution recovery apparatus comprising:
- means to supply a hydrogen storage material to a fuel vessel of a machine fueled by hydrogen generated by dehydrogenation of a hydrogen storage material through a fuel filling nozzle;
- means to recover waste solution derived from dehydrogenation from the waste solution vessel through a recovery nozzle;
- measuring means to measure a volume of the waste solution;
- analyzing means installed in the recovery nozzle for analyzing a concentration ratio of the dehydrogenation product and hydride in the waste solution which flow through the recovery nozzle;
- a database recording a hydride unit price and a dehydrogenation product unit price; and
- calculating means for calculating a waste solution price based on the volume of the waste solution measured by the measuring means, the hydride unit price and dehydrogenation product unit price stored in the database and a concentration ratio of the waste solution analyzed by the analyzing means,
- wherein the waste solution is sucked using negative pressure generated by compression and pumping of a fuel fluid during fuel filling.

3. The fuel filling/waste solution recovery apparatus according to claim 1, further comprising:
- measuring means to measure a volume of supplied fuel and the volume of recovered waste solution by measuring flow rates of solutions passing through the fuel filling nozzle and recovery nozzle or piping; and
- a display which shows the volume of supplied fuel and the volume of recovered waste solution which are measured by the measuring means.

4. The fuel filling/waste solution recovery apparatus according to claim 1, further comprising:
- a memory which stores a fuel filling record; and
- a transmitter which is located on the fuel filling nozzle or recovery nozzle and which transmits data in the memory to the machine which uses fuel.

5. The fuel filling/waste solution recovery apparatus according to claim 1, further comprising:
- measuring means to measure a volume of supplied fuel and a volume of recovered waste solution;
- a database which records fuel unit price or waste solution unit price; and
- calculating means to calculate unit price of supplied fuel or price of the recovered waste solution based on the volume of supplied fuel or the volume of the recovered waste solution which is measured by the measuring means and the fuel unit price or waste solution unit price recorded in the database.

6. The fuel filling/waste solution recovery apparatus according to claim 3, further comprising:
- a database which records a carbon tax rate or a subsidy rate;
- calculating means to calculate fuel loss from difference between supplied fuel and recovered waste solution volumes; and
- calculating means to calculate the amount of tax or subsidy on supplied fuel or the amount of tax or subsidy on the recovered waste solution, based on the volume of supplied fuel or the volume of the recovered waste solution measured by the measuring means and the fuel loss calculated by the calculating means.

7. The fuel filling/waste solution recovery apparatus according to claim 3, further comprising:
- estimation means to estimate a volume of pure hydrogen contained in fuel from the volume of supplied fuel; and
- display means to show a pure hydrogen volume estimated by the estimation means.

8. The fuel filling/waste solution recovery apparatus according to claim 1, wherein the fuel filling nozzle and the waste solution recovery nozzle are located coaxially.

9. The fuel filling/waste solution recovery apparatus according to claim 1, wherein the measuring means measures the volume of hydrogenation product or hydride in the waste solution before waste solution recovery to the waste solution tank and utilizes light absorption spectroscopic technology.

10. A fuel vessel which is provided in the fuel filling/waste solution recovery apparatus described in claim 2, comprising at least:
- a fuel room which stores fuel; and
- a waste room which houses residual material after use of the fuel,
- wherein the fuel room and the waste room are separated by a partition which can vary the volume ratio of the fuel room and the waste room.

11. The fuel vessel according to claim 10, wherein the partition between the fuel room and the waste room is a separation membrane which separates hydride and dehydrogenation product.

12. The fuel vessel according to claim 10, further comprising:
- a memory which records the fuel vessel's cross-section area; and
- a position sensor located in part of the partition or on the fuel vessel's inner wall for control of remaining fuel quantity.

13. The fuel filling/waste solution recovery apparatus according to claim 1, further comprising:
- communicating means located on the fuel filling nozzle or the waste solution recovery nozzle; and
- calculating means to calculate remaining fuel quantity based on data received by the communicating means.

14. The fuel filling/waste solution recovery apparatus according to claim 1, wherein the fuel vessel which stores the hydrogen storage material to be supplied to the machine which uses fuel and waste solution recovered from the machine which uses the fuel is the fuel vessel described in claim 10.

15. The fuel filling/waste solution recovery apparatus according to claim 14, wherein the fuel vessel incorporates measuring means to measure the volume of dehydrogenation product or hydride in the waste solution.

16. The fuel filling/waste solution recovery apparatus according to claim 1, wherein the measuring means measures the volume of hydrogenation product or hydride in the waste solution after waste solution recovery to a waste solution tank.

17. The fuel filling/waste solution recovery apparatus according to claim 16,
- wherein the measuring means which measures the volume of hydrogenation product or hydride in the waste solution after waste solution recovery to the waste solution tank utilizes light absorption spectroscopic technology.

18. The fuel filling/waste solution recovery apparatus according to claim 1, wherein the measuring means measures the volume of hydrogenation product or hydride in the waste solution and is located in the waste solution recovery nozzle.

19. The fuel filling/waste solution recovery apparatus according to claim 9, wherein the measuring means to measure the volume of hydrogenation product or hydride in the waste solution is located in the waste solution recovery nozzle.

* * * * *